UNITED STATES PATENT OFFICE.

HEINRICH F. D. SCHWAHN, OF BELLEVILLE, ILLINOIS.

MANUFACTURE OF ALUMINUM AND ITS ALLOYS.

964,566.   Specification of Letters Patent.   Patented July 19, 1910.

No Drawing.   Application filed December 7, 1908. Serial No. 466,255.

*To all whom it may concern:*

Be it known that I, HEINRICH F. D. SCHWAHN, a citizen of the United States, and resident of the city of Belleville, in the county of St. Clair and State of Illinois, have invented certain new and useful Improvements in the Manufacture of Aluminum and Its Alloys, of which the following is an exact specification.

My invention consists in an electric process for the production of aluminum from sulfate of aluminum, which latter can be produced very easily and cheaply from any aluminous ore by my process, Letters Patent No. 752,927, February 23, 1904, and the object of my present invention is to produce aluminum from said sulfate of aluminum, and free of carbon or aluminum carbid, which if present in the metal to any extent will render it useless for any purpose.

My invention, moreover, consists in such other features, steps and methods as will be hereinafter more fully set forth and pointed out in the claims.

In accordance with my invention the sulfate of aluminum, taking an anhydrous sulfate of aluminum of the formula $Al_2(SO_4)_3$ as a type, is diffused, at high heats, with carbon in quantities proportioned to the oxygen contained therein, thereby producing a combination corresponding approximately with the formula $Al_2(SO_4)_3 \cdot C_{18}$, and then passing through such combination an electric current, suitable in the presence of a solid or gaseous flux or both, while excluding the outer air by a usitable reducing gas and which obviously can be also accomplished by the resultant spent gases.

As a source of the carbon, to combine with the sulfate of aluminum, I may use pitch, asphaltum, tar, petroleum or the like, wood charcoal, carbonaceous matter or any other substances including gases capable of giving up carbon at their decomposition into their constituent elements if heated with the anhydrous sulfate of aluminum at a temperature of about 900° C. or at its incandescence; when such nascent carbon will readily combine with said sulfate by its great affinity for the same, especially when a substance such as pitch has been used for a source of the carbon, and convert it into an electric resistance conductor or electrolyte, thereby permitting an electrical reduction of the sulfate, which otherwise would not be possible. It is understood that the power said heated or glowing porous aluminum sulfate possesses of appropriating carbon evolved from intermingled substances or permeating gases is a case of surface attraction by the forces of catalysis innate to porous substances, and whereby the resultant amorphous carbon at the given high temperature of about 900° C. is absorbed and combines mechanically with the sulfate which becomes thereby electrically conductive or an electrolyte and consequently reducible by an electric current of sufficient volume to produce a resistance upon said electrolyte and bring it into incandescence and generate heat by which the sulfate with the aid of the carbon combined therewith is reduced to the metal in conjunction with the sulfur radical of the sulfate to sulfur which is recovered as a by-product. The said electric reduction I carry out by passing an electric current through said resistance conductor or electrolyte, preferably in connection with a flux, as such for instance, fluorids of the alkalies or alkaline earth metals; while excluding the outer air from the container, suitably by charging a reducing-gas such as regenerated producer-gas, a highly diluted gas by nitrogen, into said container or electric furnace. With this reducing gas may be also charged a gaseous flux, as such for instance, fluorin, suitably in form of hydro-fluoric acid vapors, suitably prepared, as usual, from fluor spar and sulfuric acid in a suitable substantially closed auxiliary container, suitably arranged to perform the evolving of the fluorin gradually, and convey it by means of suitable tubes or pipes to the supply-pipe of the reducing-gas to commingle therewith previous of its charging into the smelter furnace. The object of using this gaseous flux is to assist the deposition of the reduced metal for its purification by the fluorids used for a flux, and it has been noticed that by introducing the gaseous flux the solid flux remains constantly more liquid. Without the use of the gaseous flux the solid flux is apt to become mushy in course of time thereby preventing the deposition of the reduced metal to a great extent, and consequently requiring a renewal of the solid flux. The proportion of the fluorin gas to the reducing-gas may be about like 1 to 1,000 in volume, and only small quantities of such a gas mixture is required. However, all the spent gases will be confined after their discharge from the smelter furnace for the recovery of the sulfur, reduced from the sulfur radical of the sulfate by its containing carbon. The remaining spent gases may be fired or carried away and suitably used for heating, power or any other purpose.

In carrying out my invention in the preferred form and most suitable manner for commercial purposes I procure a calcined sulfate of aluminum, preferably of about the formula $Al_2(SO_4)_3$ and mix it with pitch in preference of any other substance containing carbon, and I preferably use about 20-25 parts of said pitch to about 100 parts of said calcined or anhydrous sulfate of aluminum all by weight. The mixing of said sulfate with pitch can be done very easily in the cold, when the pitch will be brittle, by pulverizing both together in a suitable puddle mill; or said mixing may be done while both, the sulfate and pitch, are hot from previous heating, and therefore only the sulfate need to be crushed or pulverized, for reason that the pitch will be liquid when hot. Then I subject such mixtures of sulfate of aluminum and pitch to a high red or yellow heat or about 900° C. in a substantially closed container. The object of having this carried out at high heats and in a closed container is to completely crack up the pitch, on its vaporization, into its constituent elements and free the carbon, and retain the same for its combining in definite proportion with the sulfate, at the prevailing high temperature, and produce the desired electric resistance material or electrolyte, which is of a coke-like appearance and to some extent of metallic luster. This material is subjected, suitably in a broken or crushed condition, and mixed with one or the other of the above named fluxes or a combination of the same, suitably also in a crushed condition, to the influence of an electric current in a suitable electric furnace, while excluding the outer air by means of a suitable reducing-gas such as regenerated producer-gas, which may be mixed also with said gaseous flux or hydrofluoric acid vapors and produce the metal free of aluminum carbid. For convenience however, and to facilitate the procedure I preferably carry out the entire process in one continuous operation, or nearly so, and preferably in my improved electric furnace, being the subject matter of an application for Letters Patent Serial No. 485,503, filed March 24, 1909, allowed Nov. 30, 1909, and which I consider as indispensable for this purpose, to get the best results.

In carrying out the process in a continuous operation and in the preferred form I proceed as follows:—I mix, as above described, said sulfate of aluminum and pitch, and leave it in the green state, and use the hereinabove described electric furnace previously and sufficiently heated in the usual way by means of an aluminum ring and the electric current, so that when the fused aluminum and flux is charged for the starting of the furnace the same will not chill, and consequently interfere with the continuation of the operation, then I charge first some ready made electrolyte and follow with the green mass or mixture of sulfate and pitch until the entire trough of the furnace is filled to its top. However, I preferably have said green mass moderately heated before its charging into the furnace, for the obvious reason that the charged mass may not cool down the furnace to any great extent when charged from time to time as fast as the metal reduces below from the produced electric resistance conductor or electrolyte above the fused mass of metal and flux by spreading upward continuously and forming a coherent body, and as fast as the green mass descends into the hotter parts of the electric circuit below, of which said body of resistance conductor then forms a part and produces more heat for its continuous production, and reduction to the metal. The solid flux is perferably added in this case in a crushed state and spread upon the previous charge of the green mass. The gaseous flux with the reducing-gas although desirable may be omitted in the production of alloys.

During the electric smelting the current acts first and principally upon the electrolyte as the highest resistance material of the charge, and secondarily only on the fused metal and flux, simply retaining the same in a fused condition. And if the process is carried out in my aforesaid improved electric furnace, which I prefer to use for a container, the rotating or circulating action of the secondary electric current on the fused metal and flux, incidentally takes in continuously the reduced metal for its deposition, and final purification by said flux, some of which will flow out with the metal on its tapping into the usual ladle, where they may separate by settling, one or the other on its bottom in accordance with the kind of flux used, and which may be made use of again as long as such flux retains its fusibility, that means becomes not overloaded with impurities, which may have been contained in the sulfate, or which may have been conveyed to the metal from the material of which said furnace has been constructed.

For the production of alloys suitable quantities of the metals to be alloyed with the aluminum may be added to the respective charges into the furnace, and in definite proportions to produce a certain desired alloy The underlying principle of this process consists in combining the sulfate of aluminum with nascent or amorphous carbon evolved from carbon containing substances including gases, mixed or charged with the sulfate into a substantially closed container and subjected to a high temperature, and then subjecting the resultant electrolyte to the action of a suitable electric current; and which differs entirely from any former attempts made in reducing aluminous compounds such as sulfate and alumina by furnace heat or that of an electric current with the aid of carbon or a carbon containing substance mixed therewith as repeatedly described in numbers of patents. I am aware of these former practices, and although they have the same object viz: producing the metal they are inoperative and without practical success; it is only the nascent or amorphous carbon which will and is able to combine with the sulfate of aluminum in defined proportion and then only at high temperatures or about 900° C. to produce an electrolyte or resistance conductor for its electrical reduction, and which I claim as my discovery and invention.

What I claim as my invention, and desire to secure by Letters Patent, is—

1. The improved manufacture of aluminum which consists in the method as herein described for producing an electrolyte and reducing the same to the metal, and consisting in combining at a high temperature a dehydrated sulfate of aluminum with carbon evolved at said high temperature from carbon containing substances including gases in the presence of said sulfate of aluminum, and then reducing the resultant electrolyte and producing metallic aluminum by the influence exerted by an electric current upon said electrolyte, while recovering the resultant sulfur as a by-product, substantially as set forth.

2. The improved manufacture of aluminum which consists in the method as herein described for producing an electric resistance conductor from anhydrous sulfate of aluminum by combining such sulfate with nascent carbon evolved from carbon containing substances including gases while subjecting the same with said sulfate of aluminum to a temperature of about 900° C., and then producing the metallic aluminum by the influence exerted by electric currents upon the resultant combination of anhydrous sulfate of aluminum and carbon being said electric resistance conductor, substantially as set forth.

3. The improved manufacture of aluminum which consists in the method as herein described for producing an electric resistance conductor from dehydrated sulfate of aluminum by combining such sulfate with amorphous carbon evolved from carbon containing substances including gases the resultant product of which corresponding in its composition approximately with the formula $Al_2(SO_4)_3C_{15}$, and then subjecting said product, being said electric resistance conductor to the influence of an electric current, while charging a suitable reducing gas into its container and producing the aluminum and sulfur, substantially as set forth.

4. The improved manufacture of aluminum, which consists in the method as herein described for producing an electrolyte and reducing the same to the metal, and consisting in combining at a high temperature an anhydrous sulfate of aluminum with carbon evolved from pitch, charged with said sulfate, and then reducing the resultant electrolyte in a container heated by the influence exerted by an electric current upon said electrolyte, and producing the pure metallic aluminum in the presence of a flux having fluorin in its composition.

5. The improved manufacture of aluminum, as herein described, which consists in producing an electrolyte by combining a sulfate of aluminum with carbon, which is executed by heating such sulfate in a suitable substantially closed container to incandescence in presence of a carbon containing substance; and then subjecting the resultant electrolyte to the influence of an electric current for the reduction of the metal, while excluding the outer air by a reducing gas to which a fluorin containing gas is added for a flux.

In testimony whereof I have hereunto set my hand.

HEINRICH F. D. SCHWAHN.

Witnesses:
   EDWARD W. WEST, Jr.,
   GEO. W. DITTHARDING.